United States Patent
Iizuka (10) Patent No.: US 10,215,272 B2
(45) Date of Patent: Feb. 26, 2019

(54) VALVE MECHANISM

(71) Applicant: Honda Motor Co., Ltd., Tokyo (JP)

(72) Inventor: Natsumi Iizuka, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/924,280

(22) Filed: Mar. 19, 2018

(65) Prior Publication Data

US 2018/0274659 A1 Sep. 27, 2018

(30) Foreign Application Priority Data

Mar. 27, 2017 (JP) ................................. 2017-061649

(51) Int. Cl.
  *F16H 57/04* (2010.01)
  *F16K 15/04* (2006.01)
  *F16K 15/18* (2006.01)

(52) U.S. Cl.
  CPC ..... *F16H 57/0435* (2013.01); *F16H 57/0424* (2013.01); *F16K 15/04* (2013.01); *F16K 15/183* (2013.01)

(58) Field of Classification Search
  CPC .... F16H 57/0435; F16K 15/04; F16K 15/183; Y10T 137/2663
  USPC ..... 184/7.2; 137/543.19; 123/196 R, 196 CP
  See application file for complete search history.

(56) References Cited

U.S. PATENT DOCUMENTS

| 4,294,278 | A | * | 10/1981 | Blake | F16D 25/14 137/115.26 |
| 6,126,818 | A | * | 10/2000 | Duerrstein | B01D 35/12 210/132 |
| 8,985,145 | B2 | * | 3/2015 | Oltman | F16K 15/188 137/533.11 |
| 9,353,850 | B2 | * | 5/2016 | Pfleger | F16H 57/0435 |
| 2004/0035476 | A1 | * | 2/2004 | Holmes | F16D 25/14 137/625.65 |

FOREIGN PATENT DOCUMENTS

| JP | S5232468 | 3/1977 |
| JP | S571872 | 1/1982 |

(Continued)

OTHER PUBLICATIONS

Office Action of Japan Counterpart Application, with English translation thereof, dated Oct. 30, 2018, pp. 1-7.

*Primary Examiner* — Kevin F Murphy
(74) *Attorney, Agent, or Firm* — JCIPRNET (57) ABSTRACT

A valve mechanism includes a communicating passage that communicates a first lubrication loop that supplies a lubricating fluid to a first lubricating part and a second lubrication loop that supplies the lubricating fluid to a second lubricating part. The valve mechanism includes: a housing main body in which a main flow passage guiding a part of the lubricating fluid to the communicating passage is formed; a branch part provided at the housing main body and branches the lubricating fluid into three directions for a first outflow port, a second outflow port, and a third outflow port; a check valve provided at the housing main body and stops a flow of the lubricating fluid from the first outflow port to the main flow passage; and a choke part provided at the check valve and adjusts a flow rate of the lubricating fluid flowing through the first outflow port.

5 Claims, 6 Drawing Sheets

(56) References Cited

FOREIGN PATENT DOCUMENTS

| JP | H07136644 | 5/1995 |
| JP | H10-096478 | 4/1998 |
| JP | 201101908 | 1/2011 |

* cited by examiner

VALVE MECHANISM

CROSS-REFERENCE TO RELATED APPLICATION

This application claims the priority benefit of Japan Application no. 2017-061649, filed on Mar. 27, 2017. The entirety of the above-mentioned patent application is hereby incorporated by reference herein and made a part of this specification.

BACKGROUND

Technical Field

The disclosure relates to a valve mechanism having a communicating passage that guides a lubricating fluid from a second lubrication loop to a first lubrication loop.

Description of Related Art

So far, a hydraulic loop for controlling an automatic transmission of a vehicle or the like using a lubricating fluid supplied from a fluid pump (a hydraulic pump) exists, and a check valve for preventing the lubricating fluid of the hydraulic loop from flowing back is known (e.g., see Patent Document 1).

[Patent Document 1] Japanese Unexamined Patent Application Publication No. H10-96478

A check valve of Patent Document 1 prevents a lubricating fluid inside a torque converter provided at a hydraulic loop from returning to an automatic transmission. Apart from a lubricating part of a gear system like the automatic transmission, a lubricating part of a clutch system is also provided at the hydraulic loop, and a choke structure for reducing a flow rate of the lubricating fluid may also be provided at the hydraulic loop in order to reduce dragging of a clutch which results from an increase in viscosity of the lubricating fluid while a temperature is low. Generally, a choke structure provided as illustrated in FIG. 8 is considered.

Figure 8:
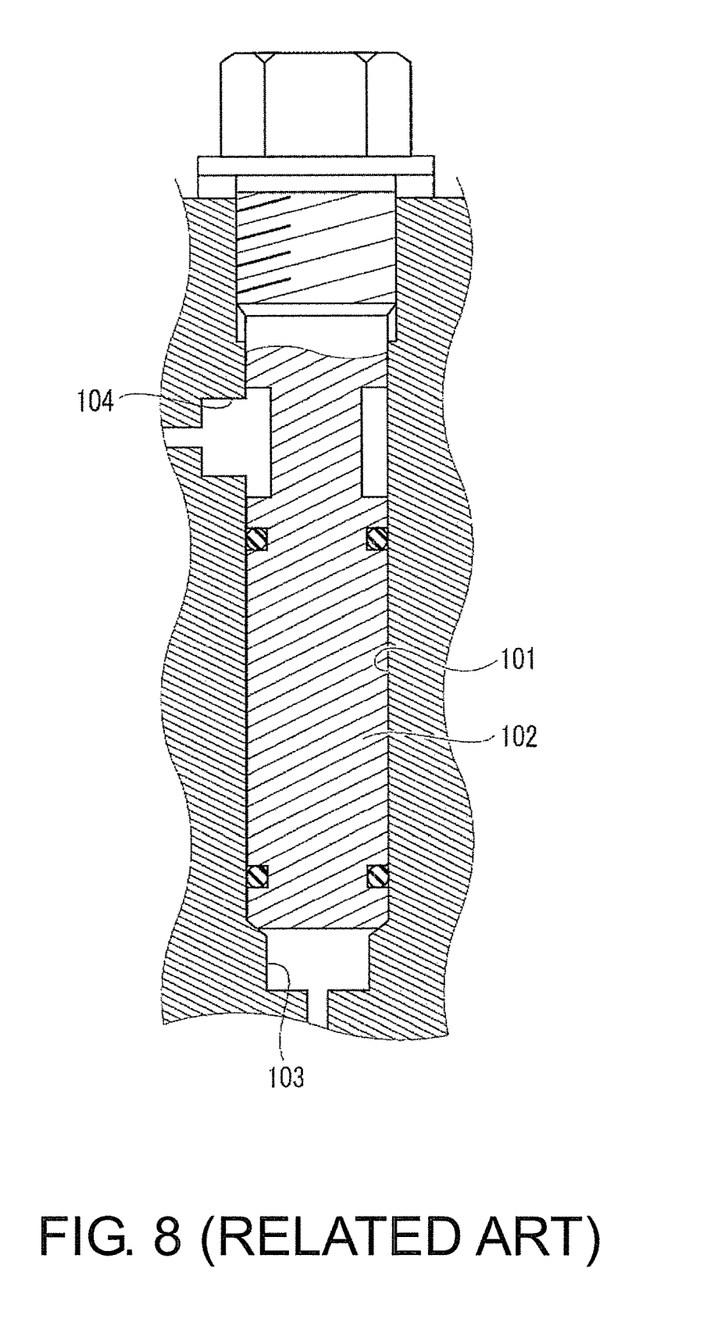
FIG. 8 is a sectional view of a choke structure according to the related art.

As illustrated in FIG. 8, the choke structure is configured such that a choke valve 102 is inserted into a cylindrical valve body 101, and a lubricating fluid enters through an inflow port 103, passes a gap between the valve body 101 and the choke valve, and is discharged through an outflow port 104. A flow rate of the lubricating fluid is adjusted by a flow passage area of the gap and a length of the gap from the inflow port 103 to the outflow port 104.

However, when the choke structure is also provided at a hydraulic loop besides providing the check valve, and when a branch part or the like for causing the lubricating fluid to branch out from the lubricating part of the gear system to the lubricating part of the clutch system is provided, a space of the hydraulic loop is increased.

SUMMARY

The disclosure was made in view of the above circumstances and is to provide a valve mechanism capable of saving a space of a hydraulic loop while providing a check valve, a choke structure, and a branch part at the hydraulic loop.

[1] The disclosure is a valve mechanism including a communicating passage (e.g., a communicating passage (9) of the present embodiment, which is also true of the following) that allows a first lubrication loop (e.g., a first lubrication loop (3) of the present embodiment, which is also true of the following) that supplies a lubricating fluid to a first lubricating part (e.g., a friction clutch (2) of the present embodiment, which is also true of the following) and a second lubrication loop (e.g., a second lubrication loop (5) of the present embodiment, which is also true of the following) that supplies the lubricating fluid to a second lubricating part (e.g., a differential gear (4) of the present embodiment, which is also true of the following) to be in communication with each other. The valve mechanism includes: a housing main body (e.g., a housing main body (32) of the present embodiment, which is also true of the following) in which a main flow passage (e.g., a main flow passage (31) of the present embodiment, which is also true of the following) guiding some of the lubricating fluid to the communicating passage is formed; a branch part (e.g., a branch part (36) of the present embodiment, which is also true of the following) provided at the housing main body and configured to branch the lubricating fluid into three directions for a first outflow port (e.g., first outflow ports (33) of the present embodiment, which is also true of the following), a second outflow port (e.g., a second outflow port (34) of the present embodiment, which is also true of the following), and a third outflow port (e.g., a third outflow port (35) of the present embodiment, which is also true of the following); a check valve (e.g., a check valve (11) of the present embodiment, which is also true of the following) provided in the communicating passage close to the first outflow port of the housing main body and configured to stop a flow of the lubricating fluid from the first outflow port to the main flow passage; and a choke part (e.g., a choke part (21) of the present embodiment, which is also true of the following) provided at the check valve and configured to adjust a flow rate of the lubricating fluid flowing out from the first outflow port.

DESCRIPTION OF THE EMBODIMENTS

[1] The disclosure is a valve mechanism including a communicating passage (e.g., a communicating passage (9) of the present embodiment, which is also true of the following) that allows a first lubrication loop (e.g., a first lubrication loop (3) of the present embodiment, which is also true of the following) that supplies a lubricating fluid to a first lubricating part (e.g., a friction clutch (2) of the present embodiment, which is also true of the following) and a second lubrication loop (e.g., a second lubrication loop (5) of the present embodiment, which is also true of the following) that supplies the lubricating fluid to a second lubricating part (e.g., a differential gear (4) of the present embodiment, which is also true of the following) to be in communication with each other. The valve mechanism includes: a housing main body (e.g., a housing main body (32) of the present embodiment, which is also true of the following) in which a main flow passage (e.g., a main flow passage (31) of the present embodiment, which is also true of the following) guiding some of the lubricating fluid to the communicating passage is formed; a branch part (e.g., a branch part (36) of the present embodiment, which is also true of the following) provided at the housing main body and configured to branch the lubricating fluid into three directions for a first outflow port (e.g., first outflow ports (33) of the present embodiment, which is also true of the following), a second outflow port (e.g., a second outflow port (34) of the present embodiment, which is also true of the following), and a third outflow port (e.g., a third outflow port (35) of the present embodiment, which is also true of the following); a check valve (e.g., a check valve (11) of the present embodiment, which is also true of the following) provided in the communicating passage close to the first outflow port of the housing main body and configured to stop a flow of the lubricating fluid from the first outflow port to the main flow passage; and a choke part (e.g., a choke part (21) of the present embodiment, which is also true of the following) provided at the check valve and configured to adjust a flow rate of the lubricating fluid flowing out from the first outflow port.

According to the disclosure, since the valve mechanism has the three functional components of the branch part, the check valve, and the choke part that are not separately provided but are integrated, the entire valve mechanism is made to be small, and a space of the hydraulic loop can be saved. Further, since the three functional components are integrated, they can be assembled at one time when assembled, and assemblability can be improved.

[2] In the disclosure, the check valve preferably includes: a valve casing (e.g., a valve casing (12) of the present embodiment, which is also true of the following) formed by a part of the housing main body; a tapered valve seat (e.g., a valve seat (13) of the present embodiment, which is also true of the following) formed at the housing main body; a ball-shaped valve body (e.g., a valve body (14) of the present embodiment, which is also true of the following) moveably housed in the valve casing and brought into contact with the tapered valve seat to stop a flow; and a cover (e.g., a cover (15) of the present embodiment, which is also true of the following) provided at the housing main body and configured to regulate movement of the ball-shaped valve body. Since the check valve has a structure in which the ball-shaped valve body is brought into contact with the tapered valve seat, a backflow of the lubricating fluid can be prevented with a simple structure, and the check valve can be made to be small.

[3] In the disclosure, the choke part is preferably provided at the cover, and the choke part is preferably formed of a plurality of holes (e.g., holes (23) of the present embodiment, which is also true of the following) that are arranged in a concentric circle using a receiver (e.g., a receiver (22) of the present embodiment, which is also true of the following) as the center, wherein the receiver receives the ball-shaped valve body when the lubricating fluid flows. Since the choke part is formed to provide a plurality of holes for the cover, the choke part can be configured to be shorter than a conventional component. Further, a necessary flow rate can be adjusted by the plurality of holes and diameters of the holes.

[4] In the disclosure, the plurality of holes are preferably arranged to be asymmetric with respect to the center of the receiver. The arrangement of the holes has the asymmetric structure so that the ball-shaped valve body can approach a hole having a high flow velocity or a hole having a low flow rate when the lubricating fluid flows, and a so-called ball rampage that the valve body moves to be agitated inside the cover can be inhibited.

[5] In the disclosure, the second outflow port preferably has a function of a choke. Due to this structure, the flow rate of the lubricating fluid can also adjusted by the second outflow port.

Figure 1:
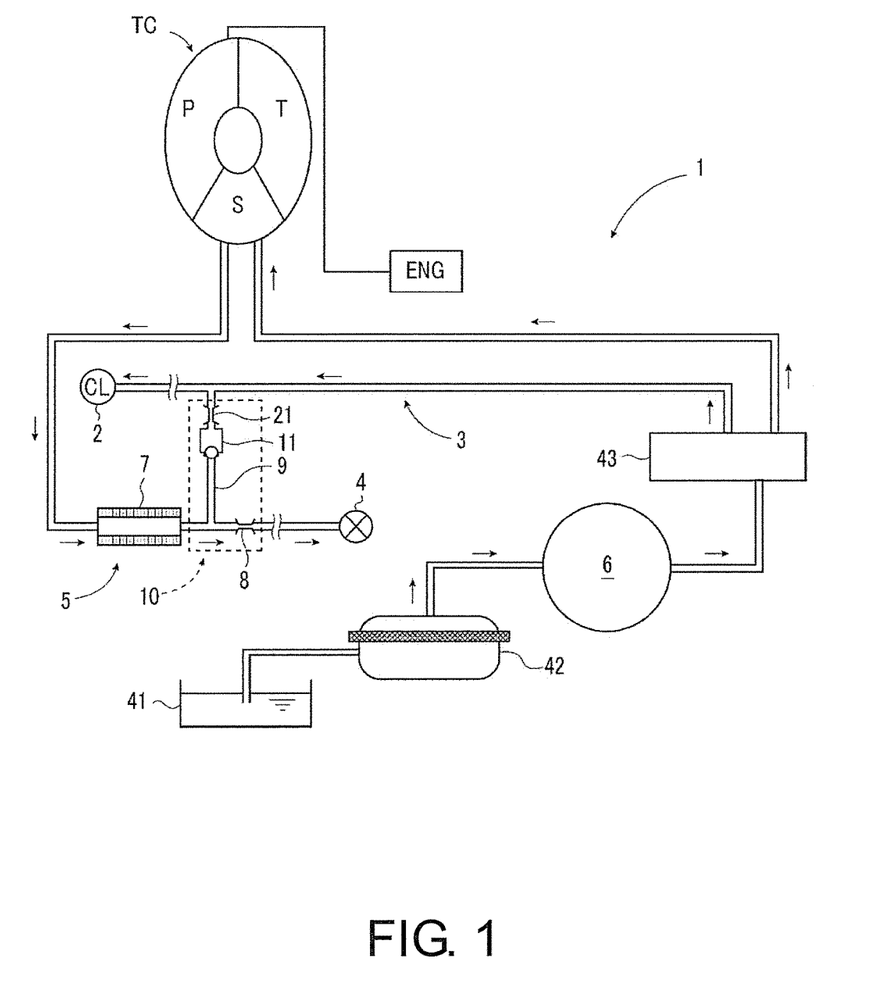
FIG. 1 is an explanatory diagram schematically illustrating an embodiment of a lubrication loop of the disclosure.

A valve mechanism 10 of an embodiment of the disclosure will be described with reference to the drawings. As illustrated in FIG. 1, the valve mechanism 10 of the embodiment of the disclosure is provided in a hydraulic loop 1. In FIG. 1, for convenience, only portions required to describe the hydraulic loop 1 are illustrated. The hydraulic loop 1 is for supplying a lubricating fluid (hereinafter referred to as a lubricant) to a power transmission device mounted in a vehicle (an automobile). The hydraulic loop 1 includes a first lubrication loop 3 that supplies the lubricant to a first lubricating part 2 (hereinafter referred to as a friction clutch) provided in the power transmission device via a main shaft or the like, a second lubrication loop 5 that supplies a lubricant whose temperature is adjusted to a second lubricating part 4 (hereinafter referred to as a differential gear) provided in the power transmission device, and a hydraulic pump 6 that is activated using power of a drive source ENG (an internal combustion engine or an electric motor).

The second lubrication loop 5 includes an oil warmer 7 that exchanges heat between an engine coolant and the lubricant, and a choke 8 for the second lubrication loop. The lubricant adjusted to a proper temperature by the oil warmer 7 is supplied to the differential gear 4 via the choke 8 for the second lubrication loop.

A communicating passage 9 allowing the first lubrication loop 3 and the second lubrication loop 5 to be in communication is provided at the hydraulic loop 1. A check valve 11 that checks a flow of the lubricant from the first lubrication loop 3 to the second lubrication loop 5 and a choke part 21 that adjusts a flow rate of the lubricant from the first lubrication loop 3 to the second lubrication loop 5 are interposed in the communicating passage 9.

When the hydraulic pump 6 is activated, a lubricant accumulated in an oil pan 41 is suctioned via a strainer 42 and is supplied from the hydraulic pump 6 to a regulator valve 43. Some of the lubricant supplied to the regulator valve 43 is supplied to the friction clutch 2 and is used as a lubricant for lubricating and cooling the friction clutch 2. Some of the lubricant supplied to the regulator valve 43 is guided to the oil warmer 7 via a torque converter TC.

Here, when the drive source ENG has lower rotation than predetermined rotation, the hydraulic pump 6 activated using the drive source ENG of the vehicle has low rotation less than the predetermined rotation. When the hydraulic pump 6 has the low rotation less than the predetermined rotation, an amount of discharge of the hydraulic pump 6 itself is reduced. In addition, a flow rate of the lubricant to the first lubrication loop 3 is restricted by the regulator valve 43 such that a line pressure is maintained at a predetermined hydraulic pressure. Therefore, the lubricant is supplied from the regulator valve 43 to the second lubrication loop 5 in comparison with the first lubrication loop 3. During the low rotation, it is easy to lower a temperature of the lubricant and it is easy to increase viscosity of the lubricant. For this reason, the flow rate of the lubricant flowing along the first lubrication loop 3 is reduced.

Since the differential gear 4 has a smaller amount of generated heat in comparison with the friction clutch 2, the lubricant supplied to the differential gear 4 is preferably warmed to a certain degree to properly lubricate the differential gear 4 with the lubricant. The lubricant flowing along the second lubrication loop 5 is heat-exchanged with the engine coolant by the oil warmer 7 even during the low rotation, and is warmed to a moderate temperature.

Accordingly, during the low rotation, the flow rate of the lubricant of the second lubrication loop 5 becomes more than that of the lubricant of the first lubrication loop 3, and a pressure of the lubricant of the second lubrication loop 5 surpasses that of the lubricant of the first lubrication loop 3. The check valve 11 is opened, and the lubricant of the second lubrication loop 5 is supplied to the friction clutch 2 through the communicating passage 9 via the main shaft or the like. Thus, a sufficient amount of lubricant can be supplied to the friction clutch 2, and the lubricant can properly lubricate the friction clutch 2. At this time, the lubricant supplied to the friction clutch 2 has a relatively high temperature because it is warmed by the oil warmer 7. However, the drive source ENG has low rotation, the amount of generated heat of the friction clutch 2 is also relatively low, and a supply amount of the lubricant is high. Thus, a sufficient cooling effect can also be obtained during the low rotation. In the power transmission device of the disclosure, both lubricating and cooling effects are preferably obtained, but it is possible to exert only any one of the lubricating and cooling effects.

When rotation of the drive source ENG exceeds the predetermined rotation and the hydraulic pump 6 is rotated at the predetermined rotation or more, a hydraulic pressure of the first lubrication loop 3 becomes higher than or equal to that of the second lubrication loop 5. For this reason, the check valve 11 is closed, and the supply of the lubricant of the first lubrication loop 3 to the second lubrication loop 5 is checked by the check valve 11.

When the drive source ENG is rotated at a high speed, the hydraulic pump 6 is also rotated at the high rotation. When the hydraulic pump 6 is rotated at the high rotation (rotation higher than or equal to the predetermined rotation), the amount of generated heat of the friction clutch 2 may also be increased. However, the flow rate of the lubricant of the first lubrication loop 3 is sufficient, and the friction clutch 2 can be sufficiently lubricated and cooled by the lubricant of the first lubrication loop 3.

According to the hydraulic loop 1 of the present embodiment, the lubricant of the second lubrication loop 5 during the low rotation of the hydraulic pump 6 is automatically supplied to the friction clutch 2 by the check valve 11 by switching between the hydraulic pressure of the hydraulic pump 6 during the low rotation and the hydraulic pressure of the hydraulic pump 6 during the high rotation, and the supply of the lubricant of the second lubrication loop 5 to the friction clutch 2 is obstructed during the high rotation. Accordingly, in comparison with a case in which control is performed by an electromagnetic valve or the like, the configuration of the hydraulic loop 1 can be simplified.

"Low rotation lower than predetermined rotation of a fluid pump" is defined as rotation of a region is lower than a predetermined rotation, wherein the predetermined rotation is set as a rotation while a fluid pressure of the first lubrication loop 3 is identical to that of the second lubrication loop 5. The rotation while the fluid pressure of the first lubrication loop 3 is identical to that of the second lubrication loop 5 is set as the predetermined rotation, and high rotation is defined as rotation of a region higher than or equal to this predetermined rotation.

The low rotation and the high rotation use the predetermined rotation as a threshold. However, the predetermined rotation can also be considered to estimate a fluid temperature from a rotational speed. A temperature of a fluid may be detected, and opening and closing of the valve part (the check valve) of the disclosure may be switched according to the fluid temperature. In this case, the predetermined rotation may be changed depending on the fluid temperature. A boundary between a case in which the fluid pump has the low rotation and a case in which the fluid pump has the high rotation can also be set using a predetermined fluid temperature as a threshold.

Figure 2:
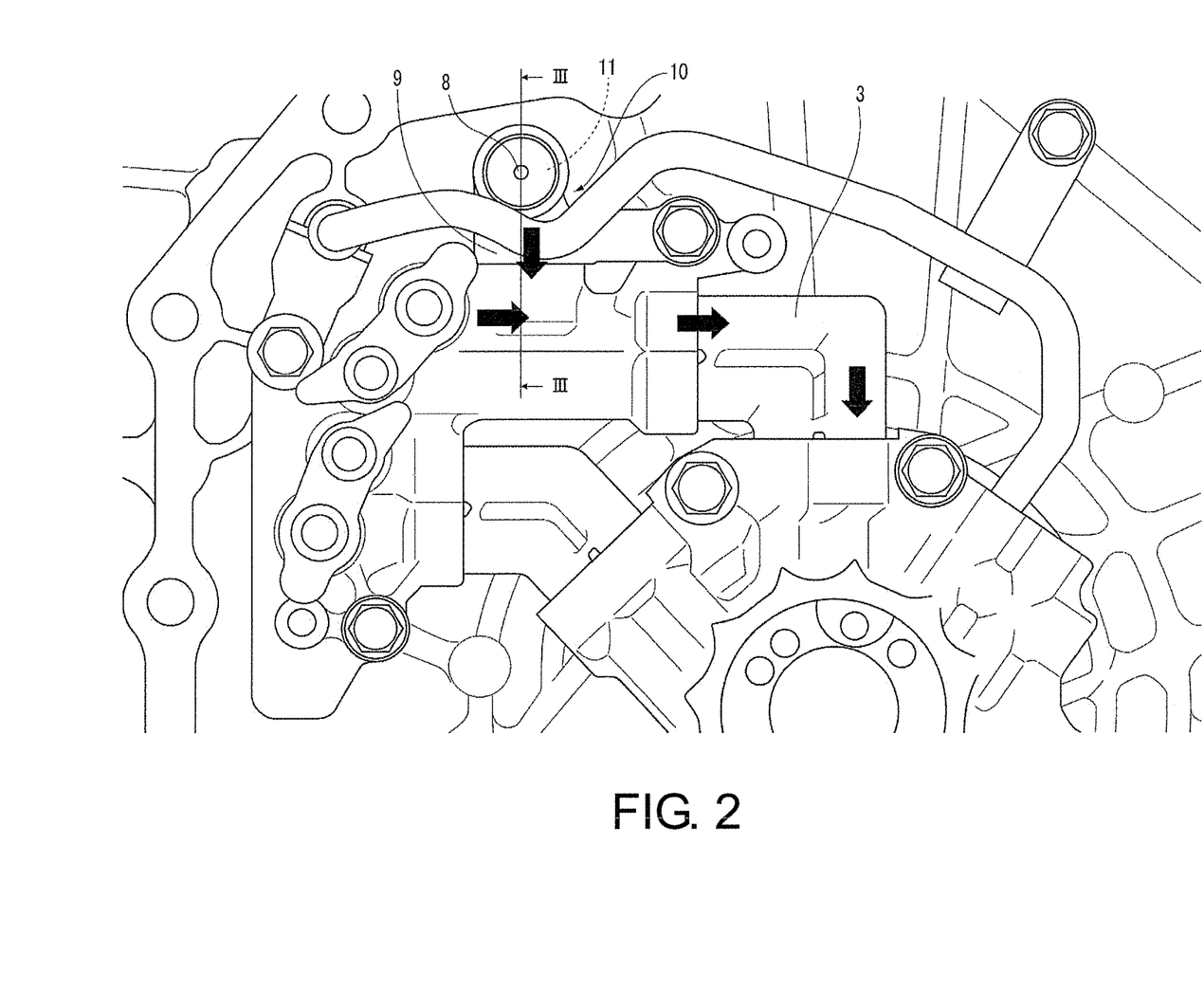
FIG. 2 is an explanatory diagram illustrating the lubrication loop of the present embodiment.

As illustrated in FIG. 2, the communicating passage 9 is connected to the first lubrication loop 3. The check valve 11, which allows the lubricant to flow from the second lubrication loop 5 to the first lubrication loop 3 and checks the flow of the lubricant from the first lubrication loop 3 to the second lubrication loop 5, is interposed in the communicating passage 9.

Figure 3:
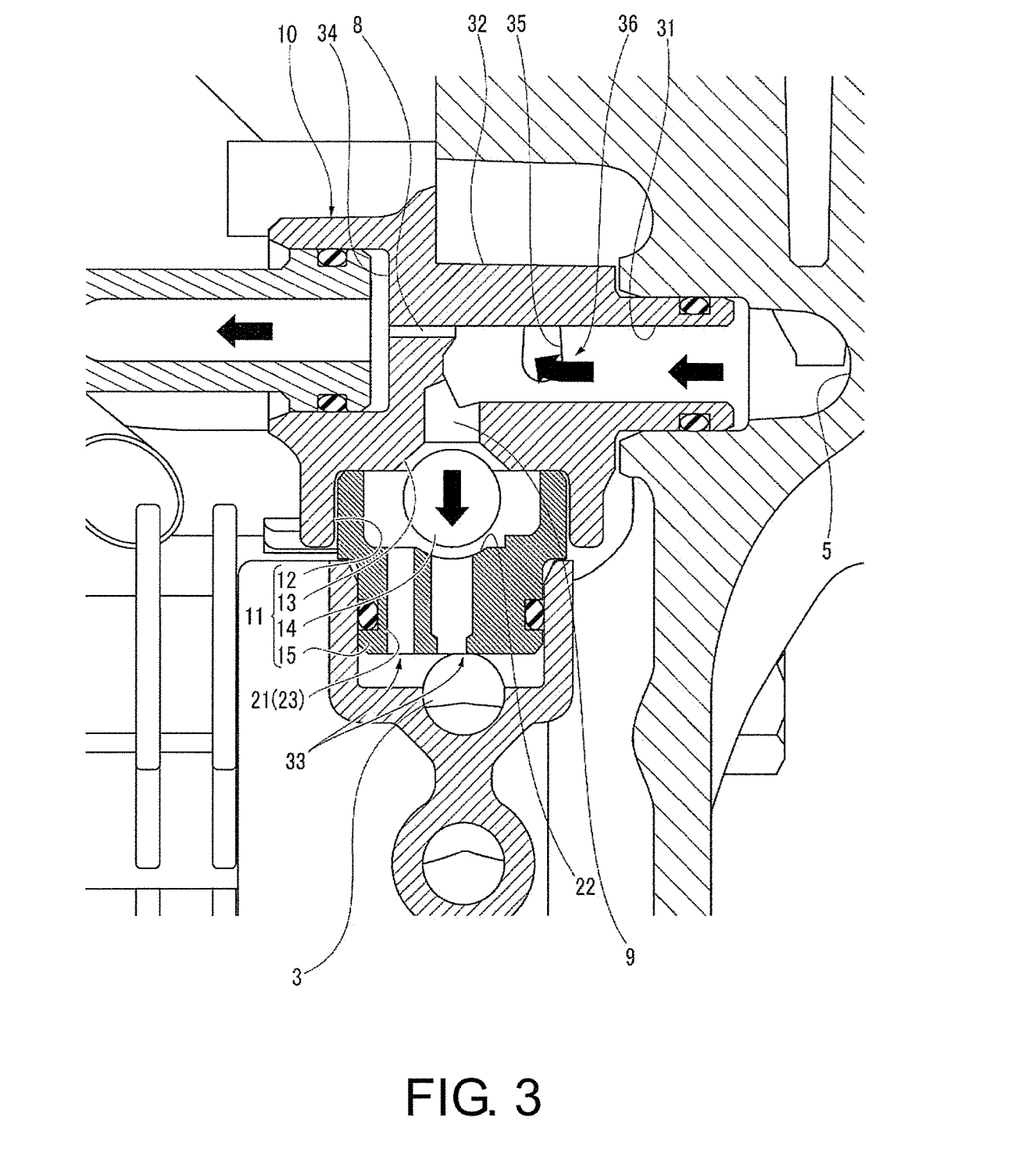
FIG. 3 is a sectional view taken along line III-III of FIG. 2.
Figure 4:
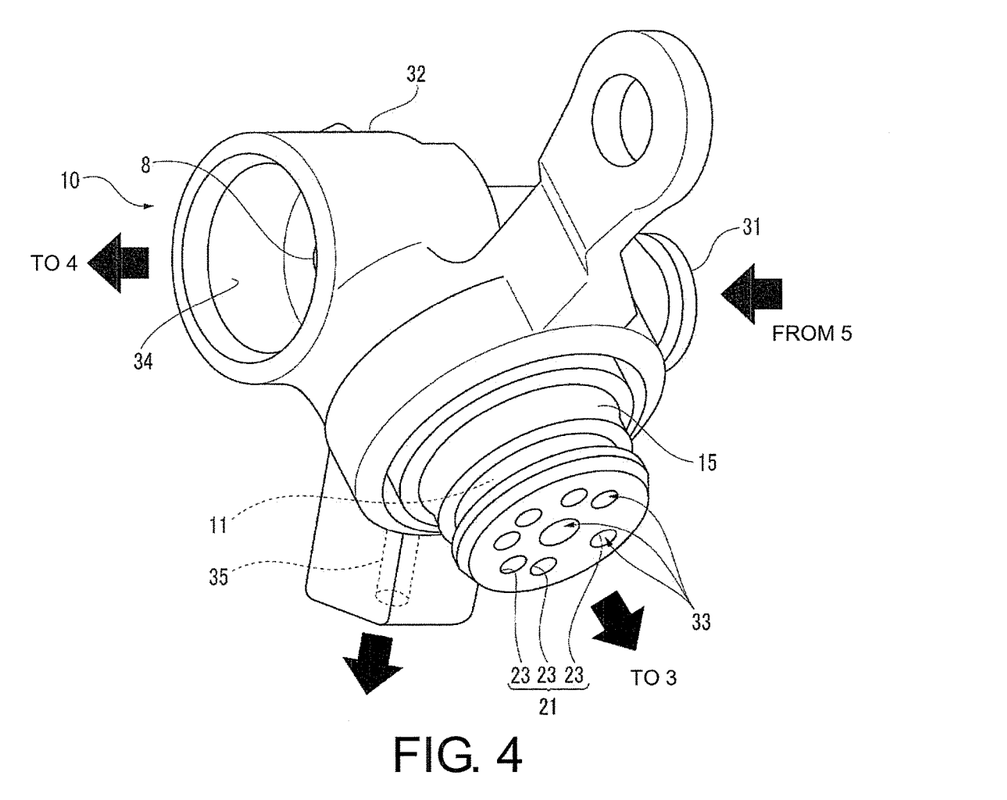
FIG. 4 is a perspective view of a valve mechanism of the present embodiment.

As illustrated in FIGS. 3 and 4, the valve mechanism 10 includes a housing main body 32 in which a main flow passage 31 guiding some of the lubricant from the second lubrication loop 5 to the communicating passage 9 is formed, a branch part 36 that is provided at this housing main body 32 and branches the lubricant into three directions for first outflow ports 33, a second outflow port 34, and a third outflow port 35, the check valve 11 that is provided in the communicating passage 9 which is close to the first outflow ports 33 of the housing main body 32 and stops a flow of the lubricant from the first outflow ports 33 to the main flow passage 31, and the choke part 21 that is provided at the check valve 11 and adjusts a flow rate of the lubricant flowing out from the first outflow ports 33.

Since the valve mechanism 10 has the three functional components of the branch part 36, the check valve 11, and the choke part 21 that are not separately provided but are integrated, the entire valve mechanism 10 is made to be small, and a space of the hydraulic loop 1 (see FIG. 1) can be saved. Further, since the three functional components are integrated, they can be assembled at one time when assembled, and assemblability can be improved.

The check valve 11 includes a valve casing 12 that is formed by a part of the housing main body 32, a tapered valve seat 13 that is formed at the housing main body 32, a ball-shaped valve body 14 that is movably housed in the valve casing 12 and is brought into contact with the valve seat 13 to stop a flow, and a cover 15 that is provided at the housing main body 32 and regulates movement of the valve body 14. The choke part 21 is provided at this cover 15.

Since the check valve 11 uses a structure in which the ball-shaped valve body 14 is brought into contact with the tapered valve seat 13, a backflow of the lubricating fluid is prevented with a simple structure, and the check valve 11 can be made to be small.

The choke 8 for the second lubrication loop is provided in the second outflow port 34 so that the second outflow port 34 has a function of the choke. Due to this structure, the flow rate of the lubricant can also be adjusted by the second outflow port 34.

Figure 5:
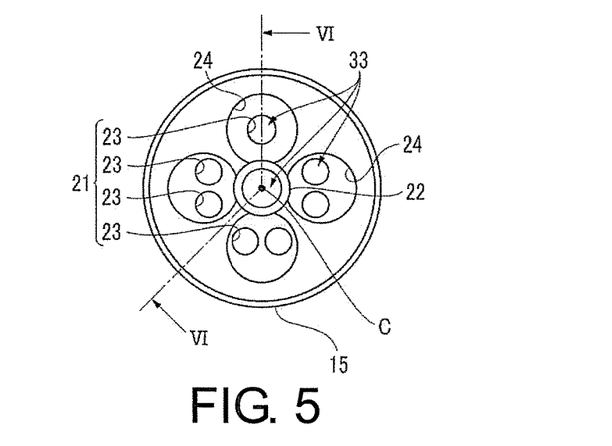
FIG. 5 is a top view of a cover of the present embodiment.
Figure 6:
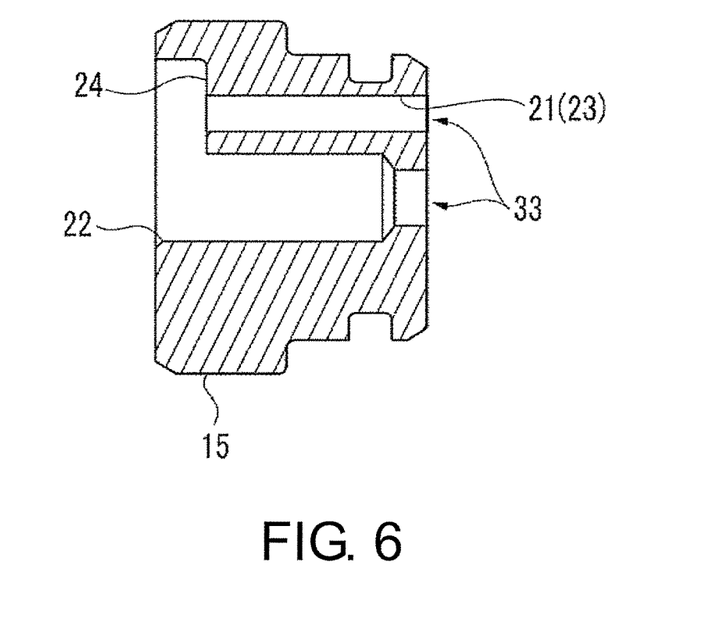
FIG. 6 is a sectional view taken along line VI-VI of FIG. 5.
Figure 7:
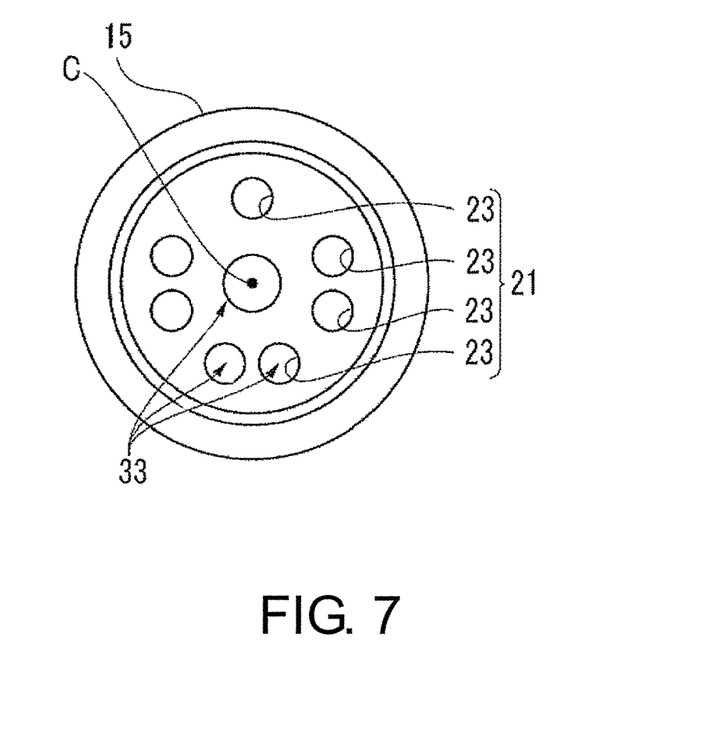
FIG. 7 is a bottom view of the cover of the present embodiment.

As illustrated in FIGS. 5 to 7, the choke part 21 is formed of a plurality of holes 23 that are arranged in a concentric circle using a receiver 22 as the center C, wherein the receiver 22 receives the valve body 14 when the lubricant flows. Four recesses 24 having an approximately circular shape in a top view are offset by 90 degrees from each other and are formed close to the receiver 22 of the cover 15 in four directions with respect to the center C. Among the recesses 24, two holes 23 are disposed for each of the three recesses 24, and one hole 23 is disposed for one recess 24. In this way, the plurality of holes 23 are arranged to be asymmetric with respect to the center of the receiver 22.

The first outflow port 33, which passes the center C, and the recess 24 are connected. For this reason, even in a state in which the check valve 11 is opened and the valve body is brought into contact with the receiver 22, the lubricant can also flow out from the first outflow port 33 passing the center C to secure a necessary flow rate.

Since the choke part 21 is configured to provide the plurality of holes 23 for the cover 15, after a necessary flow passage area is secured, the choke part 21 can be configured to be shorter than a conventional component. Further, the necessary flow rate can be adjusted by the number of holes 23 and diameters of the holes 23.

An arrangement of the holes 23 has an asymmetric structure, and thereby the ball-shaped valve body 14 can approach a hole having a high flow velocity or a hole having a low flow rate when the lubricant flows, and a so-called ball rampage that the valve body 14 moves to be agitated inside the cover 15 can be inhibited.

In the present embodiment, description has been made using the friction clutch 2 as the first lubricating part and using the differential gear 4 as the second lubricating part. However, the first lubricating part and the second lubricating part of the disclosure are not limited thereto.

What is claimed is:

1. A valve mechanism including a communicating passage that allows a first lubrication loop that supplies a lubricating fluid to a first lubricating part and a second lubrication loop that supplies the lubricating fluid to a second lubricating part to be in communication with each other, the valve mechanism comprising:

a housing main body in which a main flow passage guiding some of the lubricating fluid to the communicating passage is formed;

a branch part provided at the housing main body and configured to branch the lubricating fluid into three directions for a first outflow port, a second outflow port, and a third outflow port;

a check valve provided in the communicating passage close to the first outflow port of the housing main body and configured to stop a flow of the lubricating fluid from the first outflow port to the main flow passage; and a choke part provided at the check valve and configured to adjust a flow rate of the lubricating fluid flowing out from the first outflow port.

2. The valve mechanism according to claim 1, wherein the check valve includes:

a valve casing formed by a part of the housing main body;

a tapered valve seat formed at the housing main body;

a ball-shaped valve body movably housed in the valve casing and brought into contact with the tapered valve seat to stop a flow; and a cover provided at the housing main body and configured to regulate movement of the ball-shaped valve body.

3. The valve mechanism according to claim 2, wherein:

the choke part is provided at the cover; and the choke part is formed of a plurality of holes that are arranged in a concentric circle using a receiver as the center, wherein the receiver receives the ball-shaped valve body when the lubricating fluid flows.

4. The valve mechanism according to claim 3, wherein the plurality of holes are arranged to be asymmetric with respect to the center of the receiver.

5. The valve mechanism according to claim 1, wherein the second outflow port has a function of a choke.

* * * * *